United States Patent [19]

Mudge et al.

[11] 4,215,271

[45] Jul. 29, 1980

[54] ADJUSTABLE MIRROR MOUNT FOR PHOTOELECTRIC INTRUSION DETECTOR

[75] Inventors: Philip H. Mudge, New Fairfield; Richard Settanni, Bethel; William G. Kahl, Jr., Brookfield, all of Conn.

[73] Assignee: Arrowhead Enterprises, Inc., New Milford, Conn.

[21] Appl. No.: 957,730

[22] Filed: Nov. 6, 1978

[51] Int. Cl.² .............................................. H01J 3/14
[52] U.S. Cl. ...................................... 250/216; 250/239
[58] Field of Search .............. 250/216, 221, 222, 239

[56] References Cited

U.S. PATENT DOCUMENTS

| | | | |
|---|---|---|---|
| 3,535,539 | 10/1970 | Malespina et al. | 250/239 |
| 3,578,978 | 5/1971 | Laurent | 250/216 |
| 4,097,733 | 6/1978 | Langenbach et al. | 250/221 |

Primary Examiner—David C. Nelms
Attorney, Agent, or Firm—Parmelee, Johnson, Bollinger & Bramblett

[57] ABSTRACT

An improvement in a photoelectric intrusion detector unit of the type designed to resemble a duplex electrical outlet. An angled mirror and a collimating lens are supported on a common mount which is rotatable about an axis of rotation which is angularly displaced from the optical axis of the lens but passes through its focal point. The optical axis of the lens describes a conical surface about the axis of rotation.

7 Claims, 7 Drawing Figures

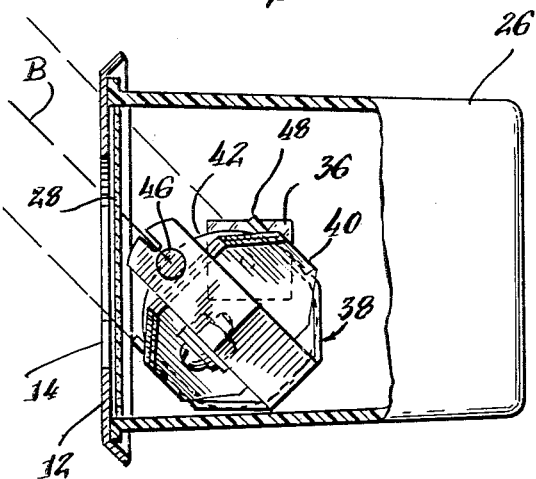
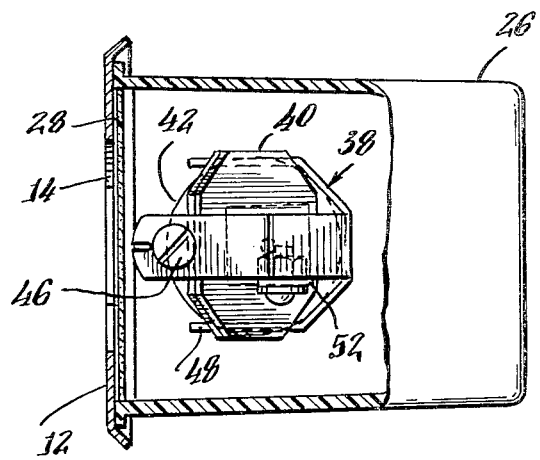
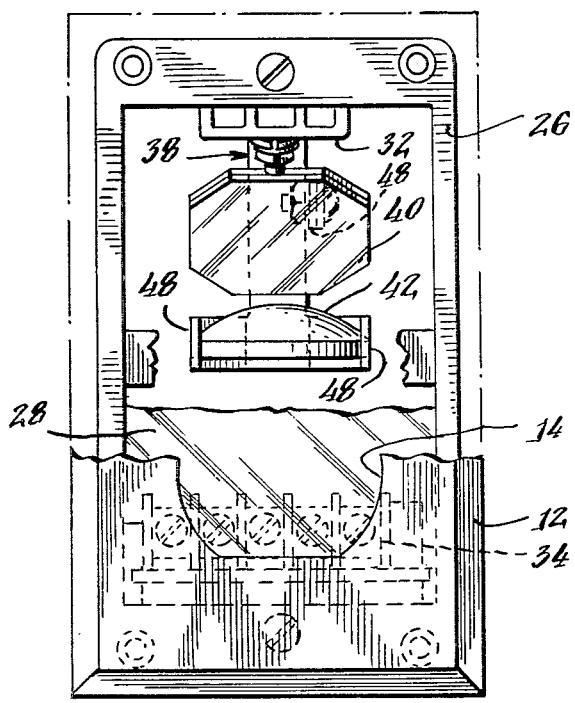
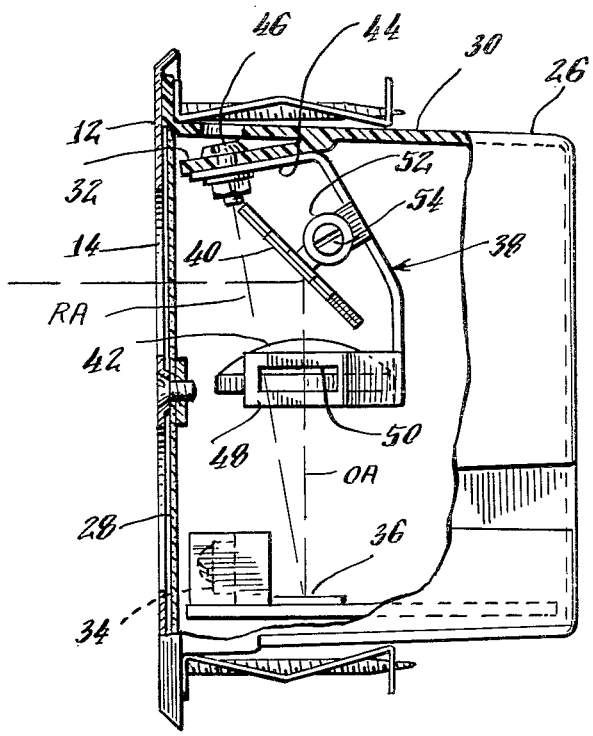

ADJUSTABLE MIRROR MOUNT FOR PHOTOELECTRIC INTRUSION DETECTOR

BACKGROUND OF THE INVENTION

One relatively common type of intrusion detector system employs a pulsed beam of infrared radiation passing through an area to be protected. When the beam is broken by an intruder, a suitable alarm is actuated. The infrared beam is formed by a transmitter and received by a receiver. In one well-known type of installation, both the transmitter and the receiver are designed to be inconspicuous and resemble, upon casual inspection, a conventional duplex electrical outlet. Each is recessed into a wall and covered by a conventional duplex outlet plate. One of the openings in the outlet plate defines a window for transmitting or receiving the infrared beam. The openings are backed by a filter plate which is substantially opaque to visible light but is transparent to infrared.

The mechanical construction of the transmitter and receiver units is substantially identical, although one includes a radiation source such as a light emitting diode while the other includes a radiation detector. Each unit has a mirror placed immediately behind the window at an angle of approximately 45° to the horizontal and a lens which is fixedly mounted directly below the mirror. The lens is a collimator and at its focal point is either a radiation source (in the case of a transmitter) or a radiation detector (in the case of a receiver). The mirror is designed to be pivoted about a vertical axis which is also the optical axis of the lens. In this matter it can be caused to "look" in a direction up to 45° to the surface of the wall in which the unit is mounted. By means of such a construction, it is possible for the invisible radiation beam to pass between two units which are not opposed to each other.

A problem with units constructed in accordance with the prior art as described above is that, as the mirror is rotated to one side or the other, its field of view is increasingly obstructed by the opening in the outlet plate. As a result of such attenuation, it has been necessary to increase the sensitivity of the electronic circuitry in compensation. This, of course, increases the cost of the circuitry. It was also desired to provide a terminal block in the front of the unit. This required that the focal point of the lens be moved farther to the rear of the unit. However, it was not desirable to move the mirror to the rear as well, since this would only compound the problem of beam attenuation.

Accordingly, it is a primary object of the present invention to provide an adjustable mirror mounting which produces less attenuation of the beam by the radiation window when positioned for oblique viewing. Other objects are to provide a unit which requires less sensitive electronic circuitry and wherein the focal point is movable to the rear of the unit without increasing beam attenuation. The manner in which these objects are achieved will be apparent from the following description and appended claims.

SUMMARY OF THE INVENTION

An improvement in a photoelectric intrusion detector of the type which includes a housing, a radiation window defined by the housing, a collimating lens in the housing, and an angled mirror within the housing to direct radiation between the lens and the window. The improvement comprises a mount supporting both the mirror and the lens for selective translation about an axis of rotation which passes through the focal point of the lens. During such translation, the optical axis of the lens describes a conical surface about the axis of rotation, while maintaining a constant distance between the lens and the radiation source or radiation detector.

BRIEF DESCRIPTION OF THE DRAWINGS

FIG. 3 is a plan view of a unit constructed in accordance with the present invention, partially broken away to illustrate its internal construction;

FIG. 4 is a side view of the unit of FIG. 3;

FIG. 5 is a front view of the unit of FIG. 4;

FIG. 6 is a view similar to that of FIG. 3 but illustrating the mirror rotated to an oblique viewing position; and, FIG. 7 is an illustration of an exemplary installation of oblique viewing units, in accordance with the present invention.

DESCRIPTION OF THE PREFERRED EMBODIMENT

In the following description, only receivers will be described. However, it is to be understood that transmitting units are substantially identical, differing primarily only in replacing the radiation detector with a radiation source.

Figure 1:
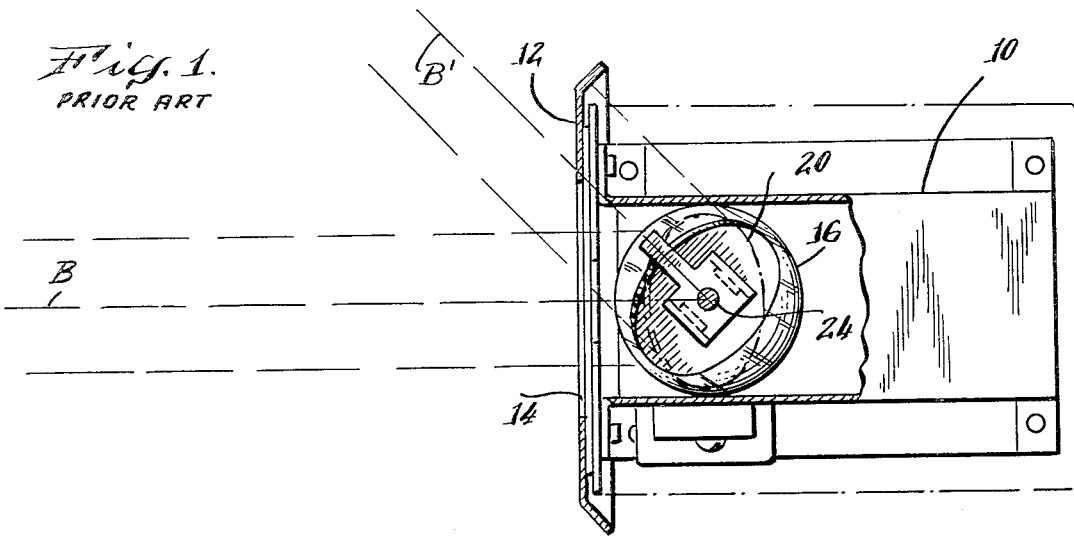
FIG. 1 is a cross-sectional plan view illustrating the pivoted mirror construction of the prior art.
Figure 2:
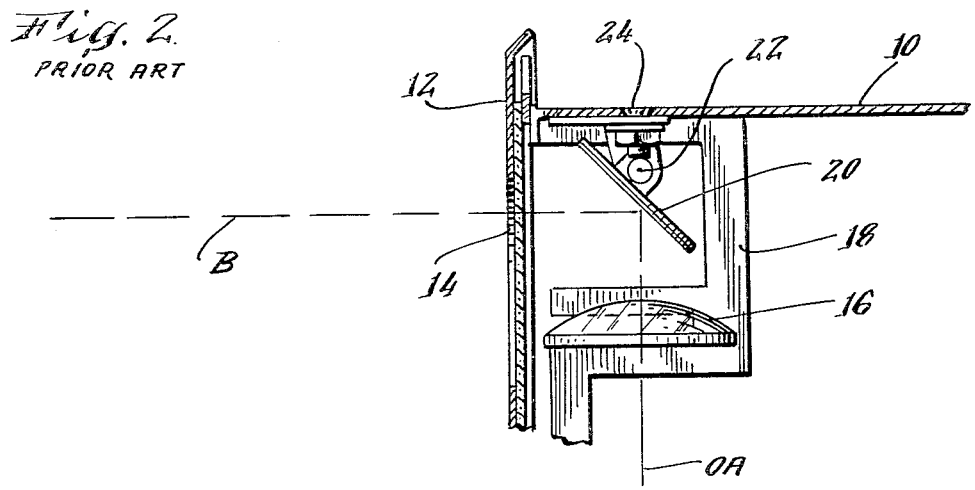
FIG. 2 is a partial, cross-sectional side view of the prior art unit of FIG. 1.

Turning first to FIGS. 1 and 2, there is illustrated the conventional prior art construction of a unit mounted within a housing 10 which would normally be positioned behind a wall and closed by a conventional duplex outlet plate 12, which defines a pair of standard openings 14 therethrough. A collimating lens 16 is fixedly mounted within the housing 10, as by means of a bracket 18, with its optical axis (OA) vertical. Its focal point (not shown) is positioned at a radiation source such as a light emitting diode, in the case of a transmitter, or at a radiation detector, in the case of a receiver. Positioned above the lens 16 is a plane mirror 20 which is adjustable as to tilt about a horizontal axis 22. Thus, as shown in FIG. 2, a beam B of radiation which enters the unit substantially horizontally is reflected downwardly along the optical axis OA of the lens 16. Accordingly, the tilt of the mirror 20 about the horizontal axis 22 is substantially 45°.

In order to provide for oblique viewing, the mirror 20 is also mounted for rotation about a vertical axis by means of an adjusting screw 24. The vertical axis of rotation of the mirror 20 coincides with the optical axis OA of lens 16. When the mirror is rotated to an oblique viewing position as shown in FIG. 1, it will be noted that the radiation received along the new axis B', is substantially attenuated by the size limitations of the opening 14 in plate 12. In fact, as shown in FIG. 1, there is an attenuation of approximately 50% of the received radiation.

In accordance with the present invention as most clearly illustrated in FIGS. 3-5, there is provided a molded plastic housing 26 which is normally recessed into a wall in the same fashion as the prior art units. The front of the housing is closed by a conventional duplex outlet plate 12 which includes the usual openings 14, the upper of which defines the radiation opening. Closing the front of the housing and behind the plate 12 is a rectangular infrared transparent filter plate 28. The housing 26 need not be described in detail, except to note that it includes an upper wall 30, which carries on its inner surface a mounting boss 32 which angles downwardly toward the front of the housing as shown most clearly in FIG. 4. At the bottom of the housing 26 and toward its front is a terminal block 34 and behind the terminal block 34 is a radiation detector 36. (In the case of a transmitter, radiation source).

The principal feature of this invention comprises the adjustable mount 38 which supports both the plane mirror 40 and the lens 42. The mount 38 is in the form of an elongated strap having a flattened upper end 44 which is mounted against the mounting boss 32 of the housing by means of a pivot screw 46. Extending from the lower end of the mount 38 are a pair of spaced arms 48, defining apertures 50 for receiving opposed side edges of the lens 42 to support it therebetween. The lens is so positioned that its focal point falls on detector 36. Intermediate the pivot screw 46 and the lens 42, the mount 38 includes a bracket 52 upon which is mounted, by means of screw 54, the mirror 40. As is the case with prior art mirrors, the mirror 40 is positioned to receive radiation entering through opening 14 and directed along the optical axis OA of the lens 42 onto the detector 36. However, unlike prior art mirrors, the mirror 40 is not rotatable about optical axis OA. Instead, the entire mount 38, including the mirror 40 and the lens 42, rotates about the pivot screw 46 and about a rotational axis RA which passes through the focal point of the lens 42 at the detector 38 as shown in FIG. 4. It will thus be seen that as the mount 38 is rotated, both the mirror 40 and lens 42 will move as a unit. In addition to rotating, the mirror 40 will translate about the rotational axis RA and the optical axis OA will describe a conical surface with its apex at detector 36 while maintaining a fixed distance between the lens and the radiation detector. The importance of the translational movement will be most apparent from FIG. 6 wherein it will be noted that the mirror 40, when pivoted to the position of maximum oblique viewing, is moved closer to opening 14 and receives radiation which is only minimally attenuated by the opening. As a result, the sensitivity of the electronic circuitry may be substantially reduced from that required in the prior art. It will also be apparent, as seen in FIG. 4, that the detector 36 at the focal point of the lens 42, may be moved to the rear of the housing to provide space for the terminal block 34 without thereby foregoing the advantage of having the mirror 40 positioned near the front of the housing.

When tilted mirror 40 is translated about the axis RA, its angle with respect to the horizontal plane will vary. However this is easily adjusted by varying the tilt by means of screw 54. It will be understood that these adjustments are normally made only once, at the time of installation.

Figure 7:
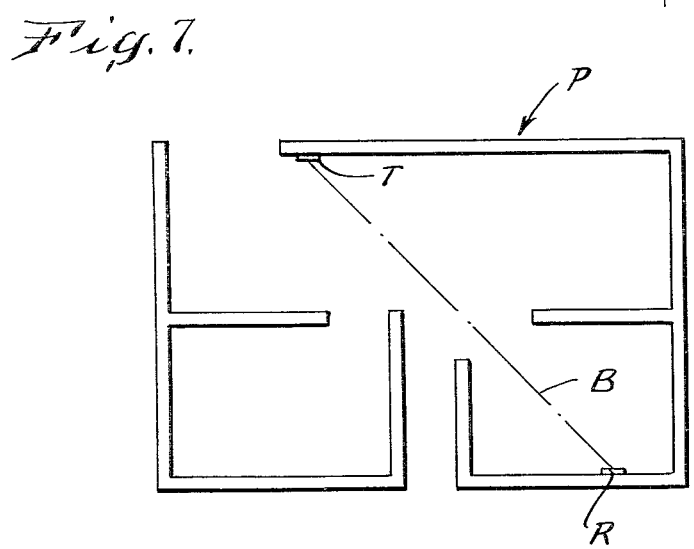

With particular reference to FIG. 7, there is shown a building plan P illustrating the manner in which a transmitter T and a receiver R, in accordance with this invention, may be utilized in their oblique viewing positions to thereby protect a maximum area.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only be the scope of the following claims.

We claim:

1. In a photoelectric intrusion detector of the type including a housing, a radiation window defined by said housing, a collimating lens in said housing having its focal point on a radiation element within said housing, and an angled mirror mounted within said housing to direct radiation between said lens and said window, the improvement which comprises: a mount supporting both of said mirror and lens for selective translation about an axis of rotation passing through said focal point, the optical axis of said lens describing a conical surface about said axis of rotation while maintaining a fixed distance between the center of the lens and said radiation element during said translation.

2. The improvement of claim 1 wherein said housing includes a top wall and said mount comprises a bracket suspended from said top wall.

3. The improvement of claim 2 wherein said housing top wall defines a planar inner support surface sloping downwardly toward said window, and said axis of rotation is perpendicular to said support surface.

4. The improvement of claim 3 wherein said bracket comprises a strap having a flattened upper end pivotally secured against said support surface, a lower end retaining said lens, and a bracket intermediate said upper and lower ends retaining said mirror.

5. The improvement of claim 4 wherein said mirror is pivotally secured to said bracket.

6. The improvement of claim 5 wherein radiation element is a radiation source.

7. The improvement of claim 5 wherein said radiation element is a radiation detector.

* * * * *